(12) United States Patent
Haywood et al.

(10) Patent No.: US 12,331,901 B1
(45) Date of Patent: Jun. 17, 2025

(54) LIGHT SYSTEM WITH A THICK LENS HAVING A BODY PORTION, WATERFALL PORTION, AND DISPLAY MECHANISM

(71) Applicant: Valeo Vision, Bobigny (FR)

(72) Inventors: Drew Haywood, Auburn Hills, MI (US); Brian Guinn, Troy, MI (US); Robert Fraizer, Auburn Hills, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/601,028

(22) Filed: Mar. 11, 2024

(51) Int. Cl.
  *F21S 41/20* (2018.01)
  *F21S 41/147* (2018.01)

(52) U.S. Cl.
  CPC .......... *F21S 41/285* (2018.01); *F21S 41/147* (2018.01)

(58) Field of Classification Search
  CPC .. F21S 41/147–148; F21S 41/24; F21S 41/26; F21S 41/27
  See application file for complete search history.

(56) References Cited

U.S. PATENT DOCUMENTS

| | | | |
|---|---|---|---|
| 5,882,771 | A | 3/1999 | Klein et al. |
| 9,360,183 | B2 | 6/2016 | Ichikawa et al. |
| 11,409,146 | B2 | 8/2022 | Lee |
| 11,713,857 | B1 | 8/2023 | Darlage et al. |
| 2002/0057575 | A1 | 5/2002 | Schwanz et al. |
| 2004/0190303 | A1 | 9/2004 | Mishimagi |
| 2006/0146555 | A1 | 7/2006 | Inaba |
| 2009/0051523 | A1 | 2/2009 | Perkins |
| 2010/0327747 | A1 | 12/2010 | Harris |
| 2012/0081915 | A1 | 4/2012 | Foote et al. |
| 2013/0242586 | A1 | 9/2013 | Huizen et al. |
| 2014/0226355 | A1 | 8/2014 | Blandin et al. |
| 2015/0345730 | A1 | 12/2015 | Kim et al. |
| 2016/0273728 | A1 | 9/2016 | Izawa |
| 2017/0108959 | A1 | 4/2017 | McMillan et al. |
| 2019/0064423 | A1 | 2/2019 | McCarter et al. |
| 2022/0252236 | A1 | 8/2022 | Thiel |
| 2023/0134384 | A1 | 5/2023 | Wu et al. |

FOREIGN PATENT DOCUMENTS

| | | |
|---|---|---|
| KR | 20230000841 A | 1/2023 |
| KR | 20230000845 A | 1/2023 |
| WO | 2001011591 A1 | 2/2001 |
| WO | 2012005412 A1 | 1/2012 |

OTHER PUBLICATIONS

Potentially related U.S. Appl. No. 18/459,967, filed Sep. 1, 2023.

*Primary Examiner* — Robert J May
(74) *Attorney, Agent, or Firm* — Young Basile Hanlon & MacFarlane, P.C.

(57) ABSTRACT

A light system comprising: a lens comprising: body portion and a waterfall portion that extends at an angle relative to the body portion so that the waterfall portion is exposed when the light system is installed in a vehicle, wherein the lens comprises a material of a first deposition and a material of a second deposition and the material of the first deposition exhibits one or more different characteristics than the material of the second deposition; a display mechanism located adjacent to the body portion, the waterfall portion, or both; and one or more light sources that direct light through the display mechanism and the lens so that when the one or more light sources are illuminated the display mechanism is visible through the lens.

20 Claims, 5 Drawing Sheets

LIGHT SYSTEM WITH A THICK LENS HAVING A BODY PORTION, WATERFALL PORTION, AND DISPLAY MECHANISM

FIELD

The present teachings relate to a light system including a lens having one or more surfaces that includes one or more display mechanisms that may be visible through the one or more surfaces.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. The light systems in addition to providing notice and illuminating surroundings also create an aesthetic of a vehicle.

Thus, there is a need for a light system with a lens that appears thick from an exterior of the light system and includes a display mechanism that displays images, decorations, labels, or a combination thereof through one or more surfaces. There is a need for a lens with two or more surfaces and the two or more surfaces may each display images, decorations, labels, or a combination thereof. There is a need for lenses that have a thickness that is about 3 mm or more or about 7 mm or more and about 15 mm or less. It would be desirable to have a lens formed with two or more layers of material with display mechanism that provides a display, images, decorations, labels, or a combination thereof that are directable therethrough.

SUMMARY

The present teachings provide: a light system comprising: a lens comprising: body portion and a waterfall portion that extends at an angle relative to the body portion so that the waterfall portion is exposed when the light system is installed in a vehicle, wherein the lens comprises a material of a first deposition and a material of a second deposition and the material of the first deposition exhibits one or more different characteristics than the material of the second deposition; a display mechanism located adjacent to the body portion, the waterfall portion, or both; and one or more light sources that direct light through the display mechanism and the lens so that when the one or more light sources are illuminated the display mechanism is visible through the lens.

The present teachings provide: a light system comprising: a lens comprising: body portion; a waterfall portion connected to the body portion; a material of a first deposition; and a material of a second deposition wherein the material of the first deposition exhibits one or more different characteristics than the material of the second deposition; a display mechanism located adjacent to the body portion, the waterfall portion, or both between the material of the first deposition and the material of the second deposition; and one or more light sources that direct light through the display mechanism and the lens so that when the one or more light sources are illuminated the display mechanism is visible through the lens; wherein the lens has a thickness of about 8 mm or more and about 12 mm or less.

The present teachings provide: a method comprising: disposing one or more display mechanisms into a mold or a cavity; forming a lens by: disposing a first material over a first side of the one or more display mechanisms at first disposition characteristics; and disposing a second material over a second side of the one or more display mechanisms or over the first material at second disposition characteristics, wherein the second disposition characteristics include a higher pressure of disposing the second material than a pressure of disposing the first material; wherein the lens has a thickness of about 8 mm or more and about 12 mm or less.

The present teachings provide a light system with a lens that appears thick from an exterior of the light system and displays images, decorations, labels, or a combination thereof through one or more surfaces. The present teachings provide a lens with two or more surfaces and the two or more surfaces may each display images, decorations, labels, or a combination thereof. The present teachings provide lenses that have a thickness that is about 3 mm or more or about 7 mm or more and about 15 mm or less. The present teachings provide a lens formed with two or more layers of material with display mechanism that provides a display, images, decorations, labels, or a combination thereof that are directable therethrough.

DETAILED DESCRIPTION

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. The fore may be a forward direction of a vehicle or a front. The aft may be a rear direction of a vehicle or a rear. Preferably, the light system projects a light from an external surface of the vehicle to a location in front of the vehicle or at an angle relative to the front or rear of a vehicle. The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light systems may be multiple light systems or light sources stacked one above the other, side by side, within different planes, within a same plane and projecting in different directions, integrated into a single light system, or a combination thereof. The light system may have multiple smaller light systems or light sources. The plurality of light systems or lights may be located in one light system. The plurality of light systems may operate independently of one another such that one light system may not affect another light system or portion of the light system. The light of the vehicle may be two or more, three or more, or four or more light systems located adjacent one another. The light system may be or include one or more static lights, one or more movable lights, and one or more light sources.

The light sources function to produce light. The light source may be a device or a plurality of devices that create light and the light extends outward from the light source. The light source may produce a high beam, a low beam, a blending beam, a running light, a daytime running light (DRL), a turn signal, a brake light, or a combination thereof. The light sources may have different functions. For example, one light source may provide a daytime running light and another light source may be a turn signal. Preferably, a first light source and a second light source combine together to provide a single light function. The light sources may direct light from a rear of a lens to a front of the lens. The light source may comprise a plurality of lights or may be a single light source within a set of light sources. The plurality of lights may be in one set or group of light sources. The plurality of lights may be located in rows, columns, a matrix, or a combination thereof. The light source may be a single light that projects light. In another example, a light source may direct light in a first direction and a second light source may direct light in a second direction that is different from the first direction. The first light from a first light source and the second light from a second light source may extend in different directions but may be visibly combined to provide a light function. The first direction may be along a z-axis within a coordinate system. The second direction may be along an x-axis within a coordinate system. The light source may direct light through a vertical portion of a lens (e.g., a waterfall portion).

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The light sources may be a single lamp or bulb. Preferably, the light sources are part of a set of light sources that includes a plurality of lamps, bulbs, diodes, or a combination thereof. The light sources may be part of a set of light sources that includes 2 or more, 3 or more, 4 or more, 5 more, 7 or more, 9 or more, or 11 or more light sources that produce light and combine together to form the light extending from the light system. The sets of light sources may include 20 or less, 18 or less, 16 or less, or 14 or less devices that produce light (e.g., each set may include 8 light sources or alternatively all of the sets when combined together may include 8 light sources or 2 light sources). For example, the set of light sources may be the contents of a single printed circuit board that perform a same lighting function and the set of light sources may be 8 light sources that are all located on the single printed circuit board. The set of light sources may be two or more groups of lights that are located on different printed circuit boards. The printed circuit boards may be located adjacent to one another or spaced apart from one another. The number of light sources in a part of the light may dependent upon a size of the region or a size illuminated. For example, a daytime running light may have eight or more light sources and a turn signal may have five or more light sources. In another, example, the daytime running light may include two or more groups of light sources that are spaced apart from one another such that when the two or more groups of light sources are on they combine to provide the first light function.

The light source may be one or more lights, two or more lights, or three or more lights. The light source may be static. The light sources may be free of movement. The light source may be fixed. The light sources may be a row of lights, a column of lights, a matrix of lights extending in rows and columns, or a combination thereof. For example, a matrix may have lights that are set out to be 2×2 or more, 3×3 or more, 4×4 or more, 5×5 or more, 6×6 or more, 7×7 or more, 8×8 or more, 9×9 or more, 10×10 or more. The matrix may be 100×100 or less, 75×75 or less, 50×50 or less, 25×25 or less, or even 15×15 or less. The matrix of lights may direct light through a lens (e.g., a body portion). The light sources may be a row of light sources that direct light into the lens (e.g., a body portion). The matrix may be made up of a single printed circuit board. The light sources may be located in a line or a row. The light sources may be static and may be manually or physically adjusted so that the light sources are directed to a desired location. The light sources may be fixed and the light from the light source may be moved, bent, directed, or a combination thereof by optical elements, textured portions, micro-optics, reflectors (e.g., a light guide), light blades, or a combination thereof. Each individual light of the light source may be turned on and off. The light sources may provide light towards a reflector and then the reflector may redirect (i.e., reflect) the light in a second direction. Some light sources may direct light into light pipes and some light sources may direct light towards a reflector.

The light sources (or set of light sources) of the light system may produce one light function and a second light source (or set of light sources) may produce a second light function. One light system (e.g., a bi-directional light system) may include a plurality of light sources (e.g., two or more) that produce one light function. The light system may perform only a single light function. The light system, via the light sources, may perform or provide one or more light functions, two or more light functions, or even three or more light functions. The light system may provide one or more light patterns, two or more light patterns, or three or more light patterns with a single light system. The light sources may illuminate one or more display mechanisms. The light sources may be part of a display mechanism. The light sources when illuminated may permit the display mechanism to be visible through the lens. The light sources may directly or indirectly illuminate all or a portion of a display mechanism. The light sources may be incorporated into the display mechanism or be part of the display mechanism. The light sources may be directed towards reflectors that redirect the light produced so that a light function with a light pattern (e.g., a headlight or DRL) is generated and/or visible exterior to the vehicle.

The reflectors may all be located within a housing and function to redirect the light in a predetermined pattern. The reflectors may direct light through a lens, a display mechanism, or both. The reflectors may provide indirect light (e.g., light that is directed in a first direction by a light source and then changed to a second direction by the reflector). The reflectors may combine light to form a predetermined pattern. The reflectors may each provide light to a predetermined region to form part of a pattern, part of a function, or both. One reflector may be located adjacent to one light source. The reflectors may be a plurality of reflectors. The light system may include two or more, three or more, four or more, six or more, eight or more, ten or more, twelve or more, or even fourteen or more reflectors. The light system may include 50 or less, 40 or less, 30 or less, 20 or less, or 15 or less reflectors. The reflectors may be a single reflector. The reflectors may direct light through a thick lens. The reflectors may direct light through a portion of the lens. The light system may be free of any reflectors or light directed by any reflectors The thick lens may include a body portion and a waterfall portion. The body portion and the waterfall portion may be one monolithic piece. The reflectors may have a portion that extends parallel to a body portion of a lens and a portion that extends around a waterfall portion of a lens. The reflectors may direct light through the waterfall portion of a lens. The reflectors may include a planar portion and a curved portion.

The planar portion functions to connect the reflector within the light system. The planar portion extends parallel to the body portion of the lens (e.g., a daytime running light lens (DRL lens)). The planar portion may support the printed circuit board. The planar portion may be a support for the printed circuit board to connect the printed circuit board relative to the curved portion. The planar portion may extend from a rear of the light system towards a front of the light system. The planar portion may extend along all or a portion of a length of a body portion of the lens. The planar portion may support a printed circuit board. A part of the planar portion may connect within the light system and a part of the planar portion may connect to the printed circuit board. The printed circuit board may have a portion that extends outward from the planar portion (e.g., is not in direct contact with the planar portion). The planar portion may support the printed circuit board relative to the curved portion. The planar portion may support the curved portion or vice versa.

The curved portion functions to direct light from an interior of the vehicle system to an exterior of the vehicle system. The curved portion may redirect light from a light source through the lens (DLR) lens, the waterfall portion, the display mechanism, or a combination thereof. The curved portion may extend from the planar portion. The curved portion may be curved to redirect the light to a predetermined location, in a predetermined intensity, through the waterfall portion, or a combination thereof. The curved portion may extend downward away the planar portion or the body portion of the lens. The curved portion may extend towards the waterfall portion. The curved portion may connect with the waterfall portion of the lens, a bottom of the waterfall portion of the lens, or both. The curved portion may be free of contact with the waterfall portion. The curved portion may direct light to the waterfall portion. The curved portion may direct light so that the entire waterfall portion is illuminated. The curved portion may assist in obscuring all or a portion of the light source, the printed circuit board, or both from view outside of the light system. For example, the length and the width of the waterfall portion of the lens may be illuminated so that when viewed from an exterior the entire waterfall portion of the lens may be lightened. Light may be directed from a light source into contact with the reflector and then the light may be directed from the reflector directly through the waterfall portion of the of the lens to provide a parking indicator (PI), a turn indicator (TI), daytime running light (DRL), a display, a message, a symbol, or a combination thereof. A shape and a size of the curved portion of the reflector may direct the light to a region of interest. The curved portion may direct the light so that the entire waterfall portion, entire body portion, or both are illuminated. The curved portion may have a curve that directs light through the waterfall portion. The curved portion may be located adjacent to a lens (e.g., the daytime running light lens (DRL lens)).

The lens (e.g., DRL lens) functions to provide light outside of a vehicle, notice to oncoming vehicles, provide a message, provide a symbol, or a combination thereof. The lens may provide notice during the day. The lens may be invisible when the light sources are off and visible when the light sources are on. The lens may be clear. The lens may be made of or include a polycarbonate, acrylic, or both. The lens may have one or more visible portions. The entire lens may be visible. The lens may include a waterfall portion and a body portion. The body portion may extend along a first surface of a vehicle and the waterfall portion may extend along a second surface of the vehicle. The waterfall portion may provide a thickness to the body portion such that when viewed from the front, the body portion appears thicker that an actual thickness of the body portion.

The body portion functions to retain the lens (e.g., DRL lens, TI lens, and PI lens) within the light system. The body portion may provide light or may allow visible light to be displayed. The body portion may generate or disseminate a primary light, a secondary light, or both. The body portion may extend from aft to fore and downward such that the body portion is angled toward a road surface. The body portion may allow light to pass therethrough. The light may extend through the body portion in a direction parallel to vertical. The light through the body portion may be a secondary light that provides some secondary light function. The light may provide notice. The light may provide a display through the body portion. The light may enlighten the display mechanism. The light may enlighten a display mechanism so that the display mechanism is visible, lit, glows, visible through a lens, or a combination thereof. The light directed through the display mechanism and the body portion, the waterfall portion, or both may not be part of a daytime running light. The body portion may extend internally within the light system, a housing, or both. The body portion may extend from a rear end of the light system toward a front of the light system. The body portion may extend at an angle. The body portion may extend at a downward angle (relative to a road surface or vertical). The angle may be about 90 degrees or less, about 75 degrees or less, about 60 degrees or less, about 50 degrees or less, or about 45 degrees or less relative to vertical (e.g., direction of gravity). The angle may be 0 degrees or more, about 15 degrees or more, about 30 degrees or more, or about 40 degrees or more (e.g., about 42 degrees) relative to vertical.

The body portion may be free of any light, free of internal reflection, or both. The body portion may be aligned within the light system so that the waterfall portion is aligned with an exterior of the light system. Light may be directed through the body portion in the secondary direction (e.g., vertically). The body portion may be positioned so that light may be directed through the entire waterfall portion without the body portion interfering with the light being directed to the waterfall portion.

The waterfall portion functions to provide notice, glow, light up, or a combination thereof. The waterfall portion may provide a message, symbol, image, decoration, label, display, emblem, or a combination thereof when the display mechanism is illuminated. The waterfall portion may be illuminated continuously, intermittently, when the car is on, when the car is moving, when the car is stopped, when the car is parked, or a combination thereof. The waterfall portion may extend at an angle relative to the body portion. The angle between the waterfall portion and the body portion may be such that the body portion does not interfere with the waterfall portion, the waterfall portion is coplanar with an exterior of the light system, or both. The angle between the body portion and the waterfall portion may be about 180 degrees or less, about 175 degrees or less, about 150 degrees or less, about 135 degrees or less, about 115 degrees or less, or about 105 degrees or less. The angle between the body portion and the waterfall portion may be about 60 degrees or more, about 75 degrees or more, about 90 degrees or more, or about 100 degrees or more (e.g., about 132 degrees).

The waterfall portion includes a length (height) and a width. The body portion includes a length and a width. The waterfall portion and the body portion may be combined together to form an illuminated area. The length and width form an area that is illuminated. The entire area of the waterfall portion, the body portion, or both may be visible from an exterior of the vehicle. The length and width may be greater than a thickness such that the waterfall portion provides a larger area of illumination than a thickness of a same lens would. The area is visible from an exterior so that a visible area of the lens is larger than a thickness. The area when viewed from an exterior of the vehicle may appear as a portion of a thickness or a height that is illuminated so that a length, a width, or both (e.g., area) that is illuminated is greater than a thickness. The length, the width, or both of the body portion, the waterfall portion, or both may be about 3 mm or more, about 5 mm or more, about 7 mm or more, about 1 cm or more, about 3 cm or more, about 5 cm or more, about 7 cm or more, or about 10 cm or more. The length, the width, or both may be about 50 cm or less, about 40 cm or less, about 30 cm or less, or about 20 cm or less. The length may be greater than the height such that the waterfall portion appears as a rectangle.

The thickness of the body portion, the waterfall portion, or both may be about 1 mm or more, about 2 mm or more, about 3 mm or more, about 5 mm or more, or about 7 mm or more. The thickness may be about 15 mm or less, about 12 mm or less, or about 10 mm or less. The length to thickness may have a ratio of about 1:1 or more, about 1.2:1 or more, about 1.5:1 or more, about 2:1 or more, about 3:1 or more, or about 4:1 or more. The ratio may be about 10:1 or less, about 7:1 or less, or about 5:1 or less. The body portion, the waterfall portion, or both include an interior side and an exterior side. The interior side may receive light and the exterior may project light, glow, illuminate, or a combination thereof. The interior side may include all or a portion of the display mechanism. The exterior may be free of any textures, angled features, optics, features that direct light out of the waterfall portion of the lens, or a combination thereof. The exterior may include or be connected to a display mechanism. The display mechanism may form an exterior of the lens, an interior of the lens, may be located within the lens, or a combination thereof. The exterior may assist to retain light within all or a portion of the lens such that all or a portion of the lens appears to have a homogeneous amount of light along a length, width, height, or a combination thereof. A thickness of the waterfall portion, the body portion, or both extends between the interior side and the exterior side.

The thickness functions to direct light outward and/or spread light. Light may be directly projected through the thickness of the waterfall portion, the body portion, or both. The light may directly extend from the interior side to the exterior side. The light may not be spread by the thickness. For example, the light may cause the lens to glow. The light may not be redirected within the thickness by total internal reflection. For example, the light extending through the thickness may entirely illuminate an area of the waterfall portion (e.g., a length L2 and a width) without the light being internally reflected. The light may extend orthogonal through the lens. The thickness may be less than the length, less than the width, or both. The thickness of the lens may be formed of a single material. For example, if the lens is formed by injection molding then the lens may be formed in a single deposition (e.g., shot) of material. The thickness may be formed of two or more layers (or depositions), three or more layers, or even four or more layers of material. The thickness of the lens may be formed in one or more applications, two or more applications, or three or more applications (e.g., shots or deposits). The thickness of the lens may be formed out of a same material in different deposits such that the lens material is homogenous. A same material may be applied at different formation conditions. For example, a first deposition may be applied at a first pressure and a second deposition may be applied at a second pressure. The deposition conditions may vary in temperature, time of deposition, volume, pressure, material, mold temperature, velocity of material, density, or a combination thereof. The deposition conditions may cause the materials of the deposition to have different characteristics even through the materials are identical before deposition.

The lens may be formed by depositing material into a mold or cavity before a display mechanism. The lens may be formed by first adding a display mechanism into a mold or cavity. The display mechanism may be disposed first so that the display mechanism forms a rear surface of the lens. The display mechanism may be disposed first and then once deposited a front side of material is disposed over the display mechanism. A rear layer of material may be disposed over a rear of the display mechanism. The deposition of material deposited directly on to the display mechanism may be applied at a first deposition pressure (e.g., pack pressure) and a first deposition velocity. The first deposition pressure and the first deposition velocity may be sufficiently low so that as the material is deposited the material retains the display mechanism in the deposited state. Stated another way, as the material is deposited the material does not shift, move, curl, float, bend, damage, or a combination thereof the display mechanism. The first deposition may occur at first deposition conditions. The first deposition conditions may be a temperature, pressure, flow velocity, time, volume, speed, flow rate, any other conditions discussed herein, or a combination thereof.

The first deposition conditions may include a deposition pressure. The deposition pressure may be sufficiently low so that the display mechanism is prevented from shifting, moving, curling, floating, bending, damage, or a combination thereof. The deposition pressure may be about 10 MPa or more, about 20 MPa or more, about 30 MPa or more, or about 40 MPa or more. The deposition pressure may be about 60 MPa or less, about 50 MPa or less, about 45 MPa or less, or about 40 MPa or less. The deposition pressure may be determined at a point when the material extends through the gates into a cavity. The deposition pressure may change an amount of time that the first material takes to fill a predetermined amount of a cavity or mold. The first material may be applied in a time (e.g., application time) of about 0.5 second or more, about 1 second or more, about 1.5 seconds or more, about 2 seconds or more, about 3 seconds or more, or about 3.5 seconds or more. The application time may be about 10 seconds or less, about 8 seconds or less, about 6 seconds or less, about 4 seconds or less, or about 3.5 seconds or less. The application time may be determined by a volume of material applied. The material may be applied at a temperature of about 75° C. or more, about 100° C. or more, about 125° C. or more, about 150° C. or more, or about 170° C. or more. The material may be applied at a temperature of about 250° C. or less, about 225° C. or less, about 200° C. or less, about 180° C. or less, or about 170° C. or less. The material once deposited may have a dwell time, cool, or both. The material once deposited may have a first density. The density may be determined by an amount of pressure applied during the deposition processes. The material once deposited may be followed by a second deposition.

The second deposition may have second deposition conditions. The second deposition may be applied on an opposite side of the display mechanism as the first deposition. The second deposition may sandwich the display mechanism there between the first deposition and the second deposition. A second deposition may be applied in a location of the third deposition (e.g., when only two material are applied one may be in front of the display mechanism and one may be behind the display mechanism). The second deposition conditions may include a deposition pressure. The second deposition pressure may be higher than a first deposition pressure. The second deposition pressure may be about 20 MPa or more, about 25 MPa or more, about 35 MPa or more, or about 45 MPa or more. The second deposition pressure may be about 65 MPa or less, about 55 MPa or less, about 50 MPa or less, or about 45 MPa or less. The second deposition pressure may be higher than the first deposition pressure. The second deposition pressure may be greater than the first deposition pressure (e.g., a delta) by about 1 MPa or more, about 5 MPa or more, about 7 MPa or more, or about 10 MPa or more. The second deposition pressure may be determined at a point when the material extends through the gates into a cavity. The second deposition pressure may change an amount of time that the second material takes to fill a predetermined amount of a cavity or mold. The second material may be applied in a time (e.g., application time) of about 0.5 second or more, about 1 second or more, about 1.5 seconds or more, about 2 seconds or more, about 3 seconds or more, or about 3.5 seconds or more. The second material may have an application time that less than the first application time. The second application time may be equal to the first application time but more material may be applied into a mold or cavity. The second application time may be about 10 seconds or less, about 8 seconds or less, about 6 seconds or less, about 4 seconds or less, or about 3.5 seconds or less. The second application time may be determined by a volume of material applied.

The second application time may be less than the first application time by about 0.5 second or more or about 1 second or more. The second material may be applied at a temperature of about 75° C. or more, about 100° C. or more, about 125° C. or more, about 150° C. or more, or about 170° C. or more. The second material may be applied at a temperature of about 250° C. or less, about 225° C. or less, about 200° C. or less, about 180° C. or less, or about 170° C. or less. The second material once deposited may have a dwell time, cool, or both. The second material may have a second density. The second density may be higher than the first density. The second density may be higher due to the second material being applied at a higher pressure. The density of the second material to the first material may have a ratio. The ratio may be about 1:1 or less, about 1:0.95 or less, about 1:0.90 or less, or about 1:0.85 or less. The ratio may be about 1:0.25 or more, about 1:0.5 or more, about 1:0.75 or more, or about 1:0.8 or more. The second material once deposited may be followed by a third deposition.

The third deposition may apply a third material at a third location. The third deposition may be applied on a rear side of the display mechanism. The third deposition conditions may be the same as the second deposition conditions. The third deposition conditions may be applied over a second deposition material, opposite the second deposition material, or both. The second deposition material and the third deposition material may have virtually identical characteristics once applied. The third deposition material may be applied over the second deposition material. The third deposition material may be applied to a rear side of the display mechanism. The third deposition material may be a third deposition of material to form the lens. The first material, the second material, the third material, or a combination thereof may all be the same material or may be a different material. The third material may have a similar density to that of the second material. The third material may have a higher density than that of the first material. The first material, the second material, the third material, or a combination thereof may be a polycarbonate, acrylic, a thermoplastic polymer, poly(methyl methacrylate) (PMMA), or mixtures thereof. The lens or an interior of the lens may include optics, features that direct light into the waterfall portion, through the waterfall portion, or a combination thereof.

The optics function to prevent hot spots, provide a homogenous light pattern, a homogenous distribution, amount of light, intensity of light, direct light into a lens, or a combination thereof. The optics may spread the light, prevent overlaps of light from light sources, direct light out of the waterfall portion, direct light into the waterfall portion, spread light within the waterfall portion, or a combination thereof. The optics may provide a homogenous lighting appearance of a lens. The optics may be a texture added to one or more surfaces of a lens. For example, a texture may be sprayed on the waterfall portion, etched into the waterfall portion, mechanically added, mechanically formed, added during molding, added during manufacturing, or a combination thereof. The lens may be free of optics adjacent to the display mechanism or directly in line with the display mechanism. The optics may be on an external surface, an internal surface, a location between the internal surface and the external surface, or a combination thereof. The optics may guide light out of the waterfall portion as the light travels through the waterfall portion. The optics may guide light into the waterfall portion. The optics may change a direction of the light. The optics may permit light to exit a surface or enter a surface. Some lenses may include a texture portion on or in an external surface and/or an internal surface. The optics may have a shape that is a pyramid, half circle, square, rectangle, zig zag patterns, lines, cylindrical, tetrahedron, cube, hexagonal, icosahedron, a prism, a pentagonal pyramid, a cone, cuboid, a symmetrical shape, an asymmetrical shape, a geometric shape, a non-geometric shape, or a combination thereof. The optics may only be located on an interior of the waterfall portion so that when light enters the waterfall portion the light is internally reflected within the waterfall portion.

The interior and the exterior of the lens (e.g., body portion and waterfall portion) may extend parallel to one another. The interior and the exterior are located a distance apart (e.g., thickness). The distance (e.g., thickness) may be sufficiently large so that light may be internally reflected to provide a uniform amount of light throughout the waterfall portion. The distance may be 1 mm or more, 3 mm or more, 5 mm or more, or 7 mm or more. The distance may be 20 mm or less, 15 mm or less, 12 mm or less, 10 mm or less, or 8 mm or less. The thickness may be equally distributed between a first deposition, a second deposition, and a third deposition. The first deposition may be a thinnest layer of material. The second deposition may be a thickest layer of material. The first deposition and third deposition of material may be substantially equal. The first deposition layer may be about 1 mm or more, about 2 mm or more, about 3 mm or more, or about 4 mm or more. The first deposition layer may be about 7 mm or less, about 6 mm or less, or about 5 mm or less. The second deposition layer may be about 1 mm or more, about 2 mm or more, about 3 mm or more, or about 4 mm or more. The second deposition layer may be about 7 mm or less, about 6 mm or less, or about 5 mm or less. The third deposition layer may be about 1 mm or more, about 2 mm or more, about 3 mm or more, or about 4 mm or more. The third deposition layer may be about 7 mm or less, about 6 mm or less, or about 5 mm or less. The second deposition layer may be about 1 mm or more, about 2 mm or more, or about 3 mm or more than the second deposition layer, the third deposition layer, or both. For example, a first deposition layer may be about 2 mm thick and a second deposition layer may be about 8 mm thick and no third deposition layer may be present.

The interior may face the light source, receive light from the light source, include the display mechanism, or a combination thereof. The interior may be the only portion of the waterfall portion to include optics. The interior may direct light into the waterfall portion. The exterior may be illuminated by light passing into the waterfall portion. The exterior may form an outer most portion of the DRL light. The exterior may extend coplanar to other portion of the light system, other lights, lenses of the headlights, or a combination thereof. The exterior may illuminate, allow light to pass through, or both. The light system may include a controller that controls the light source to provide light to the interior so that the exterior of the waterfall portion is illuminated.

The controller may control how the lights are illuminated, a light pattern, when the lights are illuminated, or a combination thereof. The controller may turn on the lights when the vehicle is turned on. The controller may be in communication with the display mechanism. The controller may change how the display mechanism operates. For example, the controller may change illumination patterns to change a display, change a message displayed, change a color displayed, change when a message is displayed, change a size, change as shape, or a combination thereof. The controller may be in communication with the display mechanism, lights in communication with the display mechanism, or both.

The display mechanism functions to provide a message, symbol, image, decoration, label, display, emblem, or a combination thereof. The display mechanism may be fixed once the display mechanism is placed within or adjacent to the lens. The display mechanism may be a static device may provide an image or a decoration when light is directed into contact with the display mechanism. The display mechanism may be an in-mold label (IML), an in-mold decorative (IMD), or both. The display mechanism may be completely transparent. The display mechanism may be semi-transparent. The display mechanism may be opaque and may generate light. The display mechanism may glow or transmit light when light is directed into contact with the display mechanism. The display mechanism may be formed and the installed within a lens such that the display mechanism only displays the pre-determined messaging. The display mechanism may be free of any power or control. The display mechanism may be a single sheet of material. The display mechanism may be powered. The display mechanism may be a screen. The display mechanism may be a liquid crystal display (LCD), a light emitting diode-liquid crystal display (LED-LCD), a plasma panel, and electroluminescence panel, an organic light-emitting diode, a quantum-dot light-emitting diode, a flexible display, flexible electronic paper, or a combination thereof. The display mechanism may extend behind the body portion, the waterfall portion, or both. The display mechanism may be visible through the body portion, the waterfall portion, or both. The display mechanism may hidden behind the body portion, the waterfall portion, or both when the light sources are off (e.g., not visible).

Figure 1:
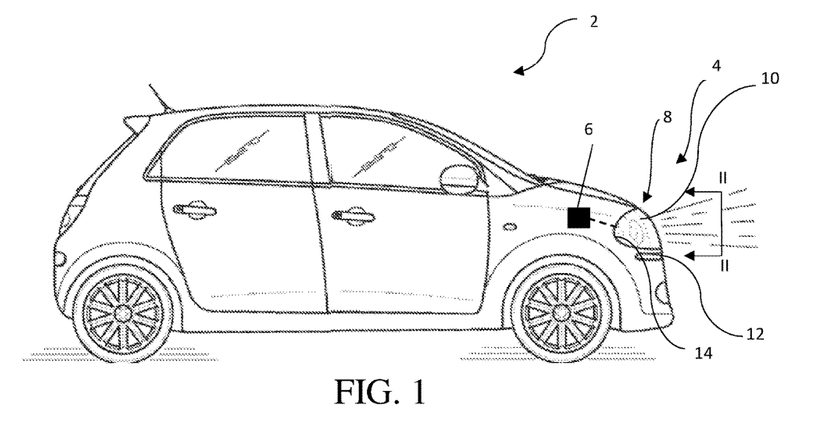
FIG. 1 is a side view of a vehicle including a light system.

FIG. 1 illustrates a side view of a vehicle 2 including a light system 4. The light system 4 is in communication with a controller 6. The light system 4 includes a headlight 8 that is covered by an outer lens 10. The light system 4 also includes a daytime running light 12 and a turn signal 14.

Figure 2:
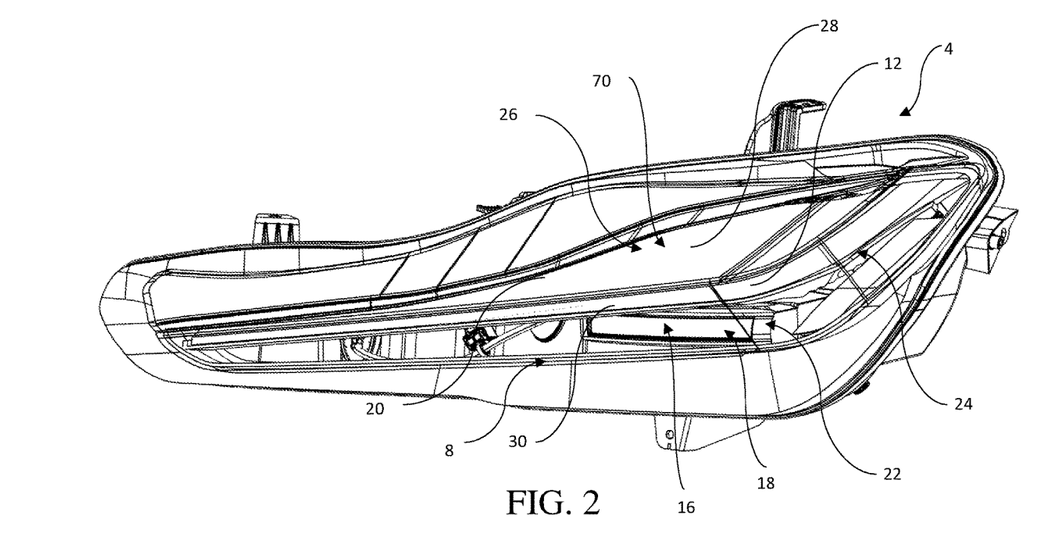
FIG. 2 illustrates a font view of the light system of FIG. 1 along lines II-II.

FIG. 2 illustrates a front plan view of the light system 4 of FIG. 1 along line II-II. The light system 4 includes headlights 8 and a daytime running light 12. The headlights 8 have a high beam 16 and a low beam 18. The high beam 16 and the low beam 18 each include light sources 20 and reflectors 22. The daytime running light (DRL) 12 includes a daytime running light lens 24 (DRL lens). The light sources 20 are located behind a lens 26. The lens 26 includes a body portion 28 and a waterfall portion 30. A display mechanism 70 may be located behind the body portion 28, the waterfall portion 30, or both so that when light is passed through the lens 26, the display mechanism 70 is illuminated and visible.

Figure 3:
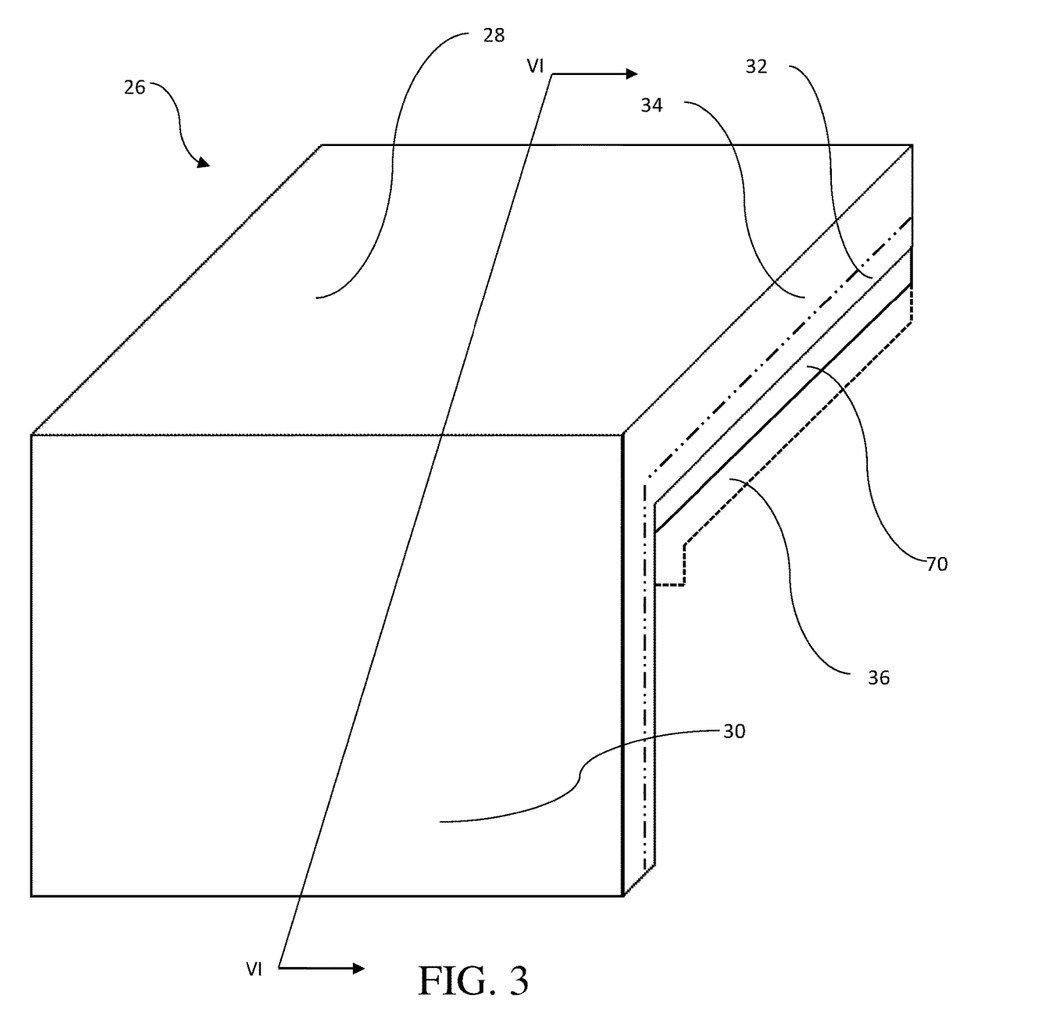
FIG. 3 is an isometric view of a lens of a light system.

FIG. 3 illustrates an isometric view of a lens 26. The lens 26 includes a body portion 28 and a waterfall portion 30. The body portion 28 and the waterfall portion 30 include a first deposition 32 and a second deposition 34. The first deposition 32 is in direct contact with a display mechanism 70. The display mechanism 70 is visible through both the first deposition 32 and the second deposition 34. A third deposition 36 is located in direct contact with a rear side of the display mechanism 70 opposite the first deposition 32. The display mechanism 70 may only be visible when a light (e.g., shown in FIG. 2) is directed through the third deposition 36, display mechanism 70, first deposition 32, and then a second deposition 34.

Figure 4:
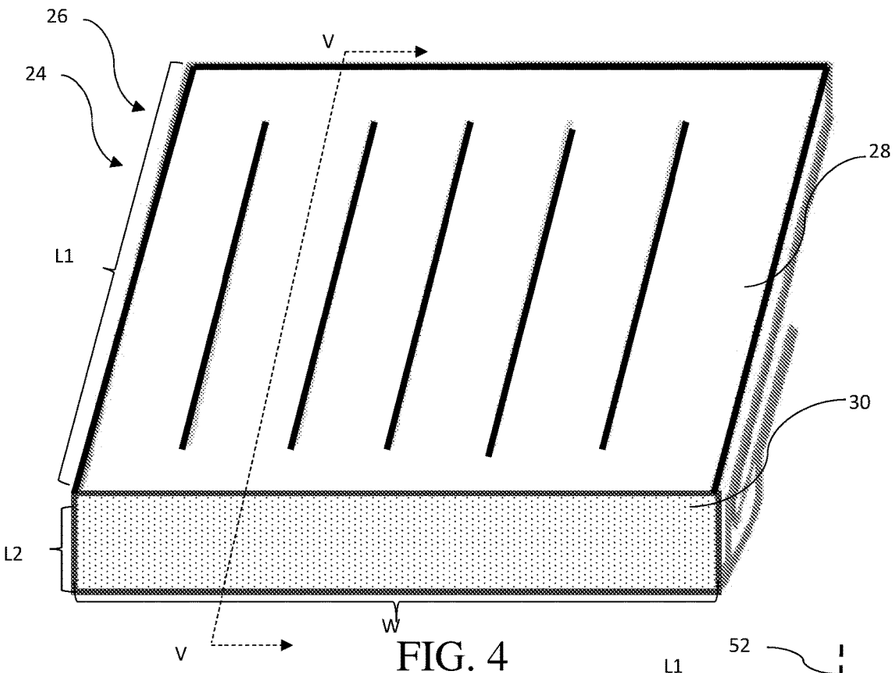
FIG. 4 is a front isometric view of a lens of a light system.

FIG. 4 illustrates an isometric view of a lens 26 (e.g., DRL lens 24, turn indicator lens, parking indicator lens). The lens 26 includes a body portion 28 and a waterfall portion 30. The body portion 28 extends upward relative to the waterfall portion 30 such that both the body portion 28 and the waterfall portion 30 are visible along a first side of the light system. During operation the waterfall portion 30 is illuminated. The body portion 28 of the lens 26 has a first length (L1) and the waterfall portion 30 has a second length (L2) so that a total length of the lens 26 is L1+L2. The length of the waterfall portion L2 is the portion of the lens 26 that is visible from a location forward of the vehicle. The lens 26 includes a width (W) that is also exposed when installed in a light system and a vehicle. The waterfall portion has a length L2 and a width W that form an area, which is illuminated.

Figure 5:
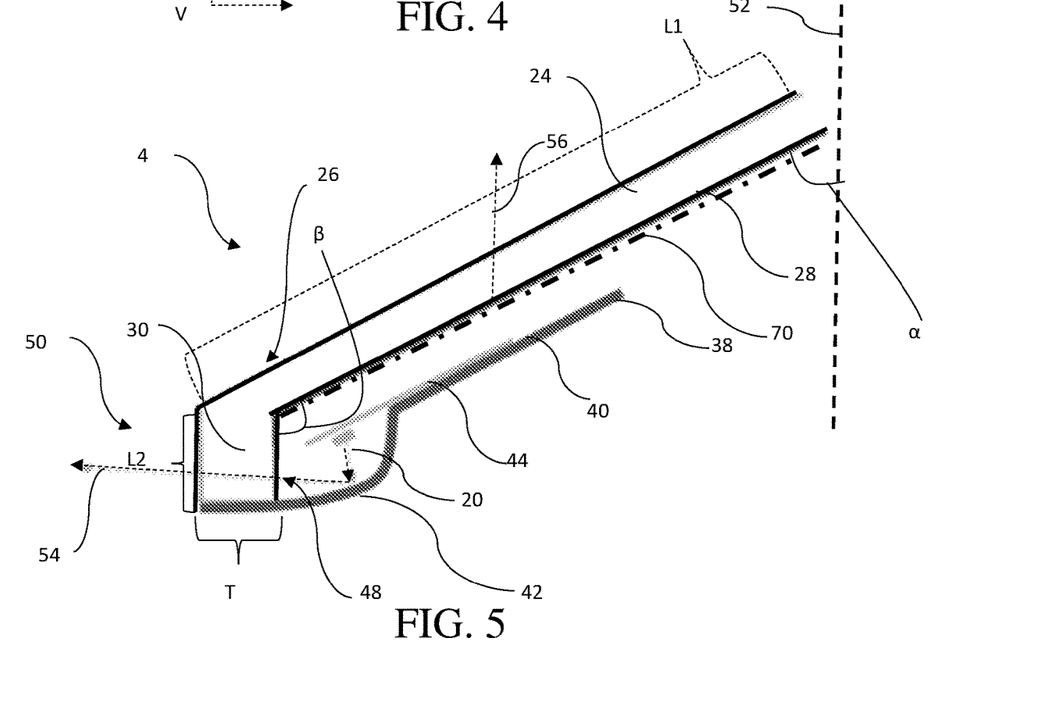
FIG. 5 is a cross-sectional view of the lens and light system of FIG. 4 along line V-V.

FIG. 5 is a cross-sectional view the light system 4 of FIG. 4 along lines V-V. The light system 4 includes a lens 26 (e.g., DRL lens 24, TI lens, or PI lens). The lens 26 includes a body portion 28 and a waterfall portion 30. The waterfall portion 30 may extend at an angle (B) relative to the body portion 28. The waterfall portion 30 includes a length (L2) that is visible as a primary surface and the body portion 28 is visible as a secondary surface (L1). A reflector 38 is located adjacent to the lens 26 and extends along the body portion 28 to the waterfall portion 30. The reflector 38 includes a planar portion 40 that extends parallel to the body portion 28 of the lens 26. The reflector 38 includes a curved portion 42 that extends from the planar portion 40. The curved portion 42 curves towards an end of the waterfall portion 30. A printed circuit board 44 extends along the reflector 38 and a light source 20 is in communication with the printed circuit board 44. The printed circuit board 44 is obscured from view behind the curved portion 42 such that someone looking at the front of the vehicle cannot see the printed circuit board 44. For example, when looking through the waterfall portion 30 along length L2 the printed circuit board 44 is not visible. The light source 20 provides light to the reflector 38 and the reflector 38 reflects the light from an interior 48 of the lens 26 through the waterfall portion 30 and out the exterior 50 so that the heights L1 and L2 are illuminated. The curved portion 42 of the reflector 38 has a shape that directs the light from the light source 20 through the waterfall portion 30 as a primary light 54 of the daytime running light lens 24. The body portion 28 extends at an angle (a) relative to vertical 52. For example, vertical 52 is a direction orthogonal to a road surface and the body portion 28 extends at the angle through the light system 4 relative to vertical so that a rear end is higher than a front end of the body portion 28. Light may pass through the body portion 28 as a secondary light 56. A display mechanism 70 is shown located along the body portion 28; however, a display mechanism 70 may be located behind the waterfall portion 30 as well. The secondary light 56 is directed through the display mechanism 70 and the display mechanism 70 is visible through the body portion 28.

Figure 6:
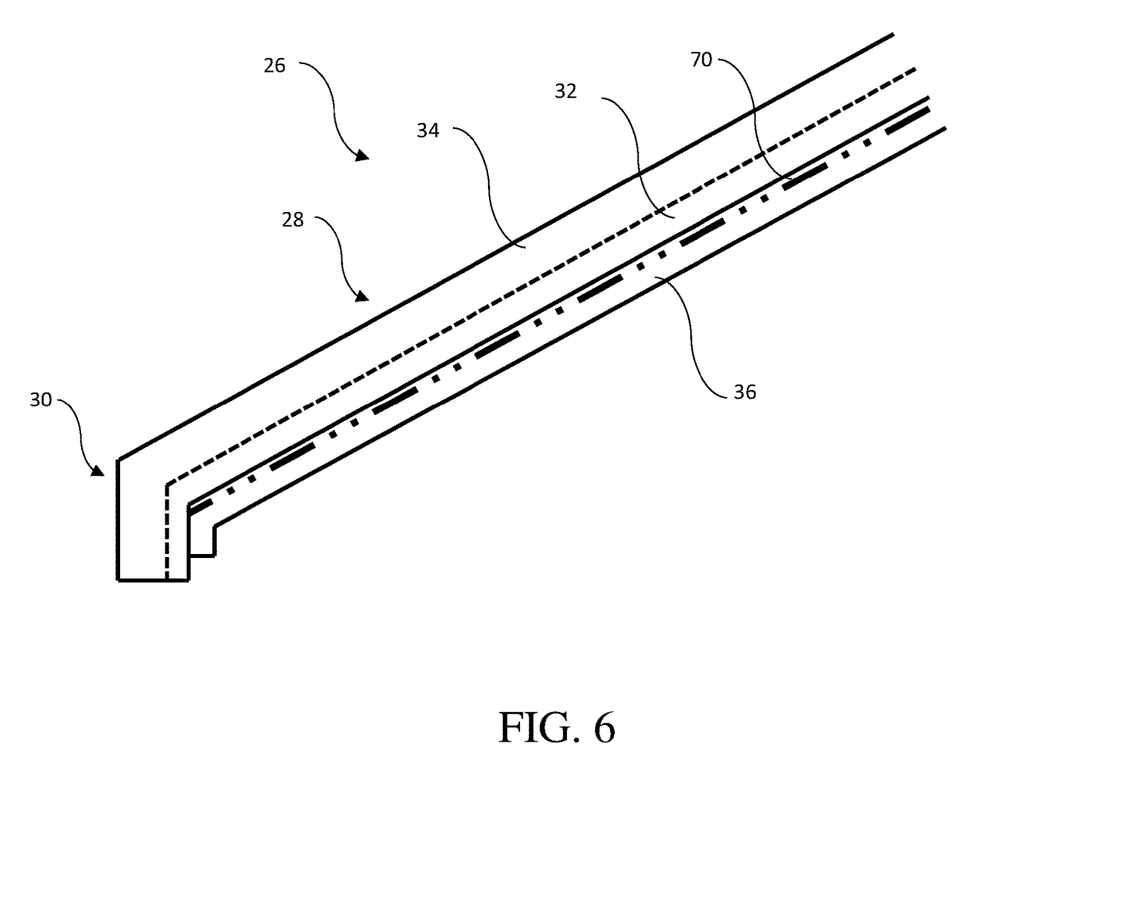
FIG. 6 is a cross-sectional view of the lens of FIG. 3 along line VI-VI.

FIG. 6 is a side cross-sectional view of the lens 26 of FIG. 3 along line VI-VI. The lens 26 includes a body portion 28 and a waterfall portion 30. The lens 26 includes a first deposition 32 and a second deposition 34. The first deposition 32 is a first material applied under first deposition conditions and the second deposition 34 is a second material applied under second deposition conditions. The first deposition 32 is applied directly over a display mechanism 70. The display mechanism 70 extends along the body portion 28. A third deposition 36 extends along a rear side of display mechanism 70. The third deposition 36 may be applied under third deposition conditions. The third deposition 36 may encapsulate the display mechanism 70 within the lens 26.

Figure 7:
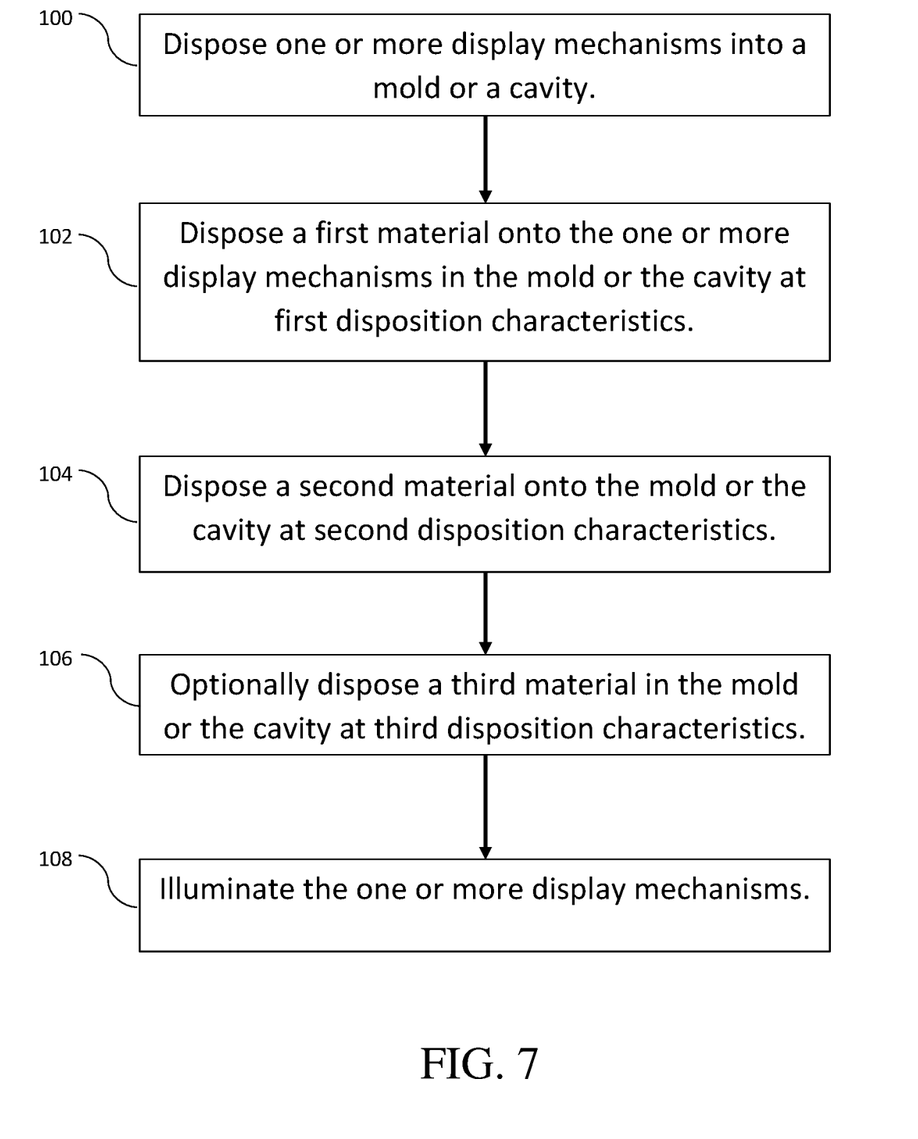
FIG. 7 illustrates a process diagram.

FIG. 7 illustrates a process diagram illustrating forming a lens and lighting the lens. One or more display mechanisms are disposed 100 into a cavity or a mold. The display mechanisms may be displayed such that the display mechanisms are located on a bottom of the mold or the cavity. A first material is then disposed 102 over the display mechanisms located within the mold or the cavity. The first material is disposed 102 at first disposition characteristics (e.g., temperature, pressure, time). A second material is disposed 104 into the mold or the cavity. The second material may be disposed 104 over the first material. The second material may be disposed 104 on an opposite side of the display mechanism as to the first material The second material may be disposed 104 at second disposition characteristics. The second dispositions characteristics may be different than the first disposition characteristics.

A third material may be optionally disposed 106 within the mold or the cavity. The third material may be disposed 106 over the first material. The third material may be disposed 106 on an opposite side of the display mechanism as the first material and the second material. The third material may be disposed 106 at third disposition characteristics. The third dispositions characteristics may be the same as the first disposition characteristics. The third disposition characteristics may be different than the second disposition characteristics.

The lens, the one or more display mechanisms, or both may be illuminated 108 by one or more light sources. The light sources may illuminate the display mechanisms so that the display mechanisms are visible.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Light System
6 Controller
8 Headlight
10 Outer Lens
12 Daytime Running Light
14 Turn Signal
16 High Beam
18 Low Beam
20 Light Source
22 Reflector
24 Daytime Running Light Lens
26 Lens
28 Body Portion
30 Waterfall Portion
32 First Deposition
34 Second Deposition
36 Third Deposition
38 Reflector
40 Planar Portion
42 Curved Portion
44 Printed Circuit Board
48 Interior
50 Exterior
52 Vertical
54 Primary Light
56 Secondary Light
70 Display Mechanism

We claim:

1. A light system comprising:
a lens comprising:
  body portion, and
  a waterfall portion that extends at an angle relative to the body portion so that the waterfall portion is exposed when the light system is installed in a vehicle, wherein the lens comprises a first material of a first deposition and a second material of a second deposition and the first material of the first deposition exhibits one or more different characteristics than the second material of the second deposition;
a display mechanism located adjacent to the body portion, the waterfall portion, or both;
a third material of a third deposition located on an opposing surface of the display mechanism as the first deposition and the second deposition so that the display mechanism is located between the first material and the second material and the third material; and
one or more light sources that direct light through the display mechanism and the lens so that when the one or more light sources are illuminated the display mechanism is visible through the lens.

2. The light system of claim 1, wherein the body portion and the waterfall portion are one monolithic piece.

3. The light system of claim 2, wherein the body portion and the waterfall portion include the first material, the second material, and the third material.

4. The light system of claim 1, wherein the first material of the first deposition and the second material of the second deposition are identical in material composition.

5. The light system of claim 4, wherein the second material of the second deposition has a higher density than the first material of the first deposition.

6. The light system of claim 4, wherein the second material of the second deposition has a greater thickness than the first material of the first deposition.

7. The light system of claim 6, wherein the first material of the first deposition and the second material of the second deposition have a thickness of about 8 mm or more and about 15 mm or less.

8. The light system of claim 1, wherein the first material of the first deposition is in direct contact with the display mechanism.

9. The light system of claim 1, wherein the third deposition and the first deposition are in direct contact with the display mechanism.

10. The light system of claim 1, wherein the angle the body portion extends relative to the body portion is upward and away from the waterfall portion so that the display mechanism is visible when from a location opposite the angle the body portion extends away from the waterfall portion.

11. The light system of claim 1, wherein the display mechanism is an in-mold label (IML) or an in-mold decorative (IMD).

12. The light system of claim 1, wherein the display mechanism is encapsulated within the third material.

13. The light system of claim 1, wherein the display mechanism is located within only the body portion.

14. A light system comprising:
a lens comprising:
  body portion;
  a waterfall portion connected to the body portion;
  a first material of a first deposition; and
  a second material of a second deposition wherein the first material of the first deposition exhibits one or more different characteristics than the second material of the second deposition;
a display mechanism located between the first material of the first deposition and the second material of the second deposition; and
one or more light sources that direct light through the display mechanism and the lens so that when the one or more light sources are illuminated the display mechanism is visible through the lens;
wherein the lens has a thickness of about 8 mm or more and about 12 mm or less.

15. The light system of claim 14, wherein the first material of the first deposition has a lower density than the second material of the second deposition.

16. The light system of claim 15, wherein the display mechanism is semi-transparent.

17. The light system of claim 14, wherein the display mechanism is sandwiched directly between the first material of the first deposition and the second material of the second deposition.

18. The light system of claim 17, wherein the display mechanism glows when light from the one or more light sources are directed into contact with the display mechanism.

19. The light system of claim 14, wherein the display mechanism is encapsulated between the first material and the second material.

20. The light system of claim 14, wherein the first deposition has a thickness of about 7 mm or less and about 1 mm or more.

\* \* \* \* \*